Oct. 27, 1953 A. V. LAPISH 2,657,060
CHANGE CYCLE CONTROL MECHANISM
Filed Jan. 6, 1950 5 Sheets-Sheet 1
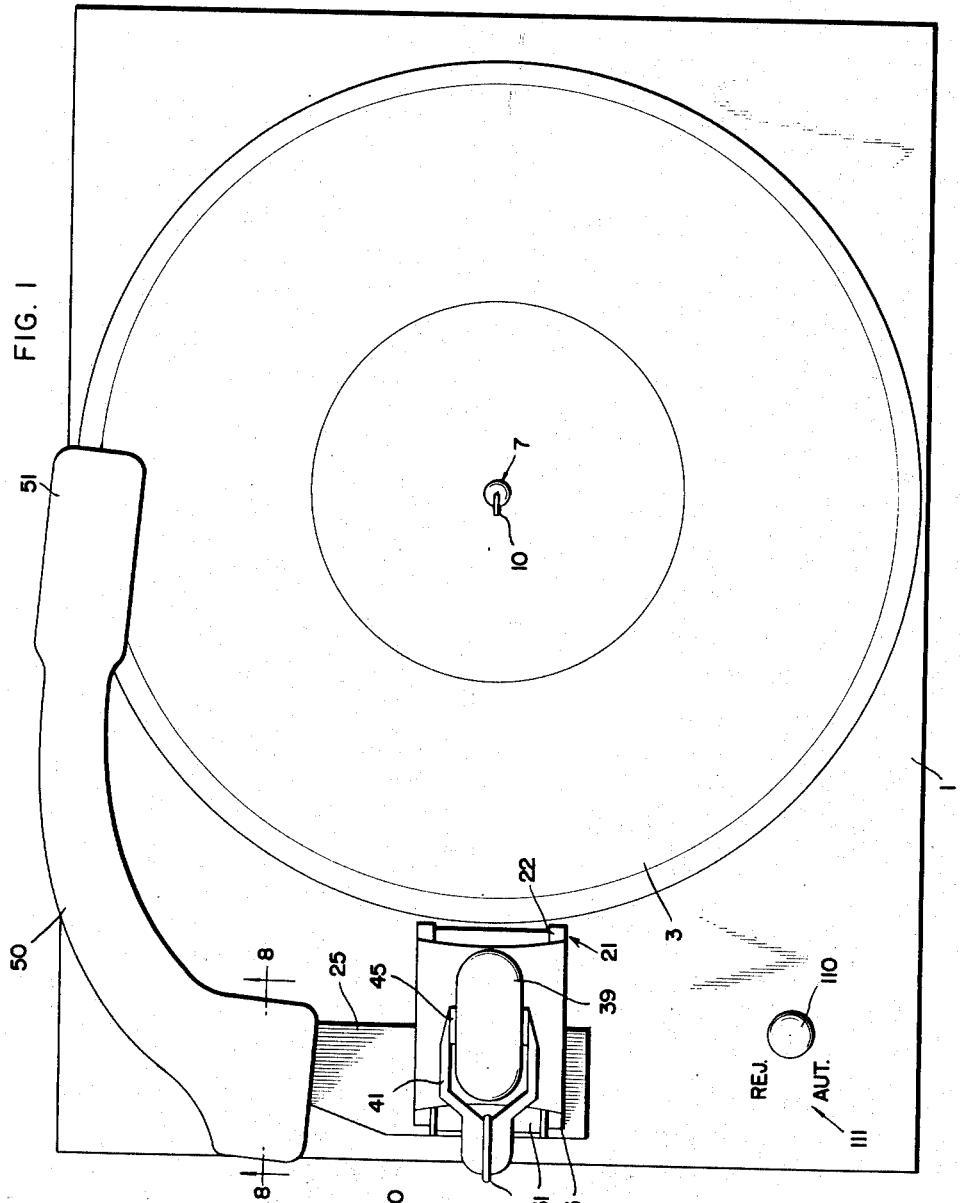
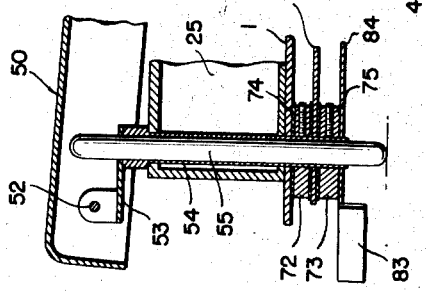
INVENTOR
ARLINGTON V. LAPISH
BY Lorimer P. Brooks
ATTORNEY Oct. 27, 1953

A. V. LAPISH 2,657,060

CHANGE CYCLE CONTROL MECHANISM

Filed Jan. 6, 1950

INVENTOR
ARLINGTON V. LAPISH

BY *Lorimer P. Brook*

ATTORNEY

Oct. 27, 1953  A. V. LAPISH  2,657,060
CHANGE CYCLE CONTROL MECHANISM
Filed Jan. 6, 1950  5 Sheets-Sheet 3
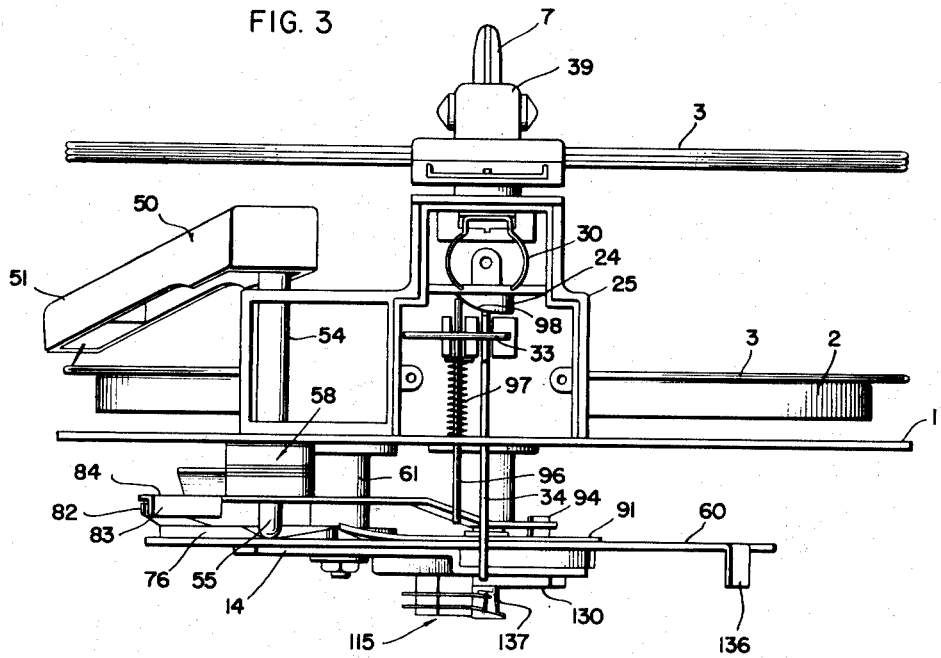
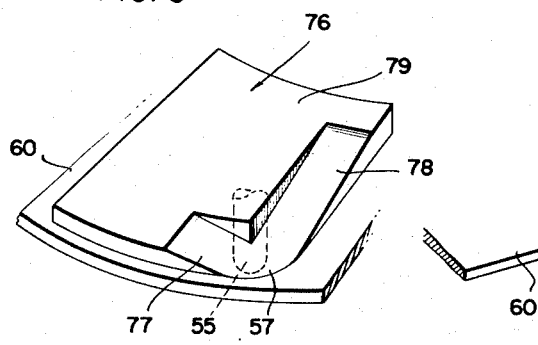
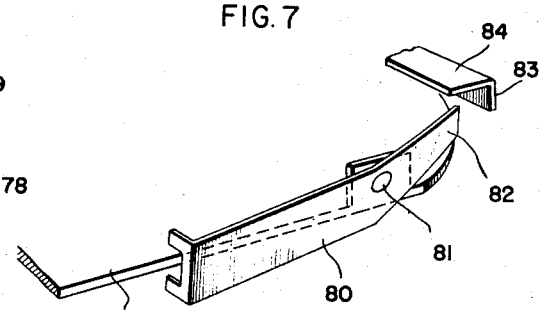
INVENTOR
ARLINGTON V. LAPISH
BY *Lorimer P. Brook*
ATTORNEY

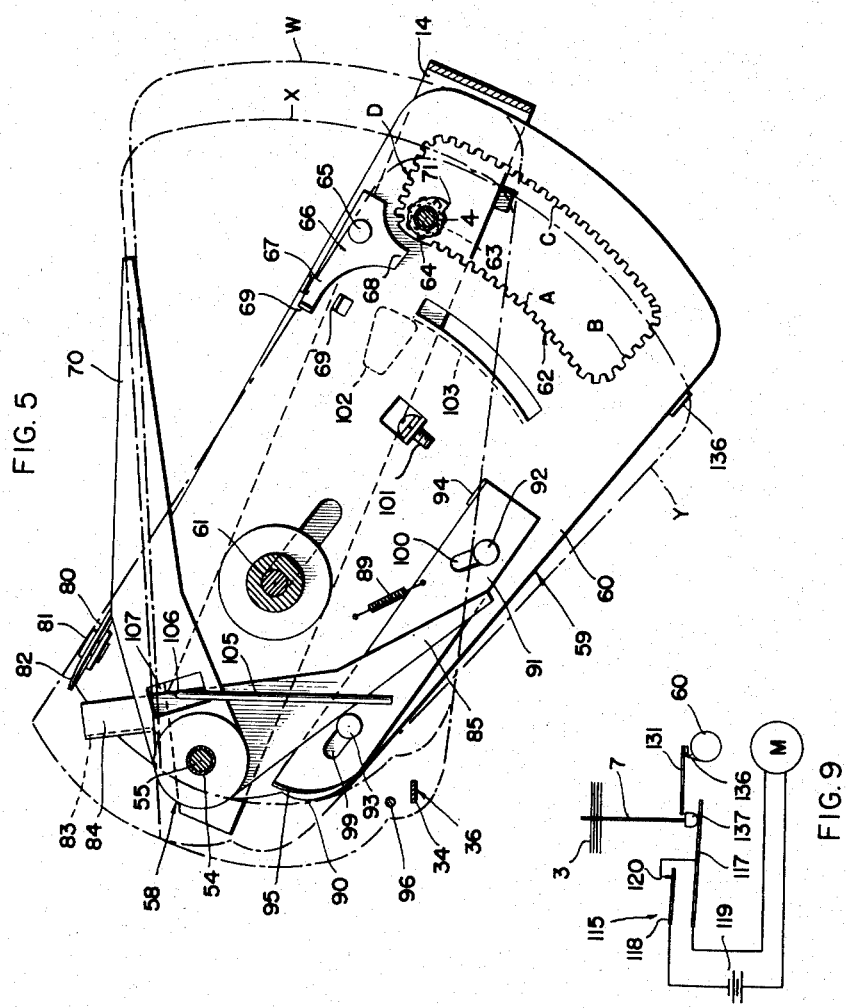

Patented Oct. 27, 1953

2,657,060

UNITED STATES PATENT OFFICE 2,657,060

CHANGE CYCLE CONTROL MECHANISM

Arlington V. Lapish, Jackson, Mich., assignor to Capehart-Farnsworth Corporation, a corporation of Delaware Application January 6, 1950, Serial No. 137,191

2 Claims. (Cl. 274—10)

This invention relates to a phonograph apparatus and is more particularly directed to an improved change-cycle control mechanism for use with phonograph apparatuses of the "drop-down" type.

Phonograph apparatuses of the "drop-down" type are well known. Generally, the change-cycle control mechanisms of these prior apparatuses employ the use of a rotatable cam gear for performing a change-cycle operation. Normally the cam gear is a die-cast member on which is formed a plurality of cam surfaces, studs and a gear member. Each portion of the cam gear must be carefully machined and aligned for successful performance.

By reason of the general design of the cam gear there is associated therewith a plurality of control levers which in turn are operatively coupled to a record-ejecting and a tone arm control mechanism. Here again, for successful operation of the phonograph apparatus the control levers must be carefully machined, aligned and adjusted with respect to the cooperating members on the cam gear. Thus, change-cycle control mechanisms of this type require precision machining and are quite complicated.

Therefore, it is an object of this invention to provide a novel unitary change-cycle control mechanism.

Another object of this invention is to provide a change-cycle control mechanism requiring the use of a minimum number of parts.

Another object of this invention is to provide a control mechanism that may be inexpensively manufactured and assembled.

Still another object of this invention is to provide a novel stop mechanism for stopping the operation of the phonograph apparatus after the last record has been played.

In accordance with this invention there is provided an automatic phonograph having a tone arm, a turntable including driving means and a record-supporting means for supporting a stack of records above the turntable. The record-supporting means has operatively connected thereto a record-ejecting mechanism for moving said records from said supporting means onto said turntable. There is also provided a unitary change-cycle control mechanism for cyclically operating said tone arm and said rejecting mechanism.

For a better understanding of the invention, together with other and further objects thereof, reference is made to the following description taken in connection with the accompanying drawing and its scope will be pointed out in the appended claims.

In the accompanying drawings:

Fig. 1 is a top plan view of a record-changing apparatus with unplayed records removed from the record-supporting means;

Fig. 3 is a side elevational view of the apparatus;

Fig. 5 is a sectional view taken on line 5—5 of Fig. 2 showing the record change-cycle control mechanism;

Fig. 6 is a fragmentary view of the cam means for elevating and lowering the tone arm;

Fig. 7 is a fragmentary view of a mechanism for swinging the tone arm away from the turntable;

Fig. 8 is a sectional view taken on line 8—8 of Fig. 1 showing the tone arm clutch mechanism; and Fig. 9 is a schematic wiring diagram of a circuit for stopping the operation of the phonograph apparatus.

Figure 2:
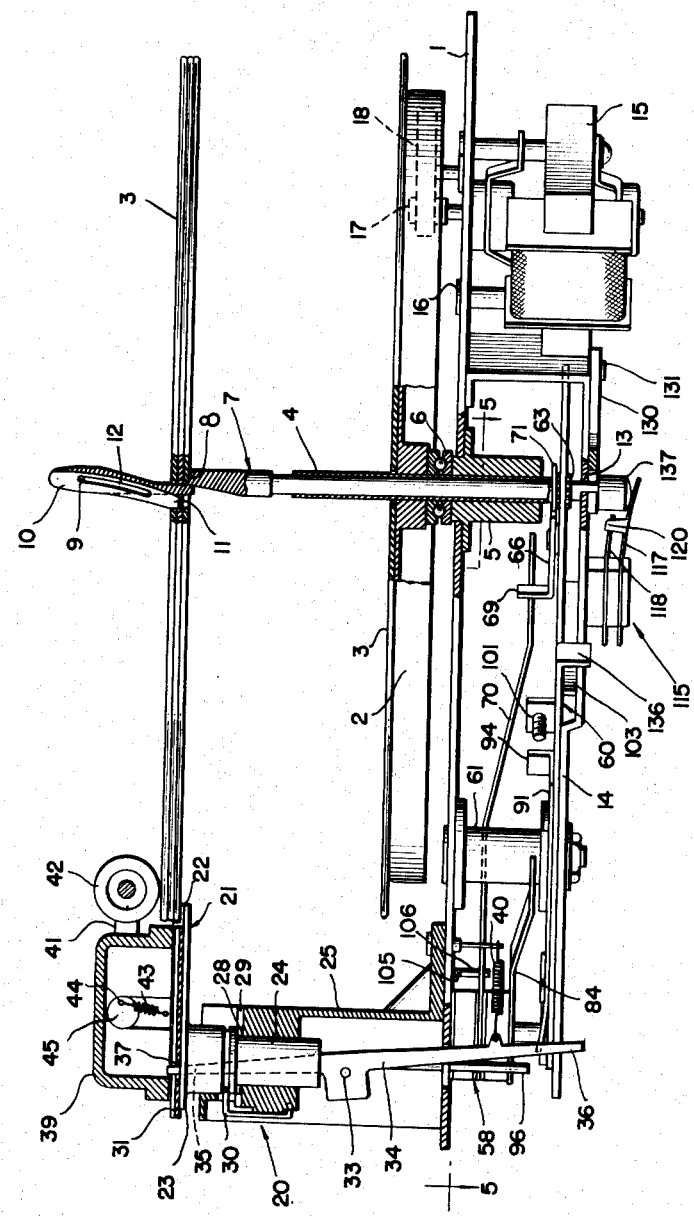
Fig. 2 is a front elevational view of the record-changing apparatus with certain parts broken away.

Referring to the drawings, there is illustrated a phonograph apparatus consisting of a base base plate 1 upon which is rotatably supported a turntable 2 carrying a record 3 for reproduction. At its center (Fig. 2), the turntable is provided with a vertical sleeve 4 which in turn is journaled in the bearing 5 depending from the base. A thrust bearing 6 disposed between the bearing 5 and the hub of the turntable rotatably supports the turntable.

Supported in the sleeve 4 is a vertical movable spindle 7 adapted to support a stack of unplayed records 3 above the turntable. Near the upper end of the spindle 7 there is formed an offset shoulder 8 acting as a center support for the stack of unplayed records 3. Slidably mounted about the pin 9 on the upper end of the spindle 7 there is arranged a pawl member 10 having a lower extension 11 projecting out of vertical alignment of the spindle 7 and terminating the thickness of a record above the lowermost record resting on the shoulder 8. From the arrangement of the pawl 10, when the records are placed on the spindle 7, the extension 11 engages the inner walls of the centering apertures of the records to align and seat the records at their center on the shoulder 8. Further, with the extension 11 terminating above the surface of the lowermost record, lateral movement of the lowermost record is permitted to allow it to be moved off of the shoulder 8 so that it may fall onto the turntable. The pawl 10 is also provided with an arcuate slot 12, the function of which is to cause the pawl 10 to retract into alignment with the spindle when the played records are removed from the turntable. The spindle 7 is locked against rotation by having its lower end formed to register with a D-shaped aperture 13 in a horizontal bracket 14, depending from the base plate.

The turntable is rotated continuously by the motor 15 secured to the base plate by means of screws 16. The motor has a drive pulley 17 which drives a frictional pulley 18 which in turn is in frictional engagement with the inner periphery of the rim on the turntable.

Cooperating with the spindle 7 (Fig. 2) there is secured to the base plate a record-ejecting mechanism 20 comprising a rotatable horizontal shelf member 21 having end portions 22 and 23 displaced 180 degrees apart which are adapted to support records of small or large diameter at their peripheral edge. Depending from the shelf 21 is a vertical sleeve 24 which in turn is journaled for rotation in a standard 25. For maintaining the record-supporting shelf 21 against movement when either end portion 22 or 23 is positioned to support records, there is arranged intermediate the ends of the sleeve 24, a pair of detents 28 which in turn are adapted to be seated in the recess 29 by the biasing action of a spring 30.

Slidably mounted on the shelf 21, there is provided a record-ejecting plate member 31 adapted to engage the peripheral edge of the lowermost record in the stack and to push it simultaneously off the shelf member 21 and the spindle 7 to drop onto the turntable. Pivoted intermediate its ends, as at 33 in the standard 25, is a substantially vertical lever 34 having a pair of arms 35 and 36. The upper end of the arm 35 extends upwardly into engagement with an aperture 37 in the plate 31. In operation, when the lever 34 is pivoted in a clockwise direction, the upper end 35 thereof engages and moves the plate 31 laterally to the right to engage and eject the lowermost record from the shelf 21 and the spindle 7. The ejecting plate 31 is normally held in its retracted position by means of a spring 40 operatively connected between the lever 34 and the base plate.

In order that the records 3 firmly seat on the shelf 21, there is secured to the shelf 21 a cap member 39 to which is pivotally mounted a hinged yoke member 41, having at its free end thereof a resilient rest 42 for engaging the upper surface of the top record above the shelf 21. The yoke 41 is urged against the records 3 by means of a spring 43 having one end thereof connected to the cap 39 at its opposite end to a pin 44 eccentrically mounted on the pivot point 45 of the yoke 41.

Pivotally mounted for horizontal and vertical movement on the standard 25 there is provided a tone arm 50 (Figs. 1, 3 and 8) having at its free end a reproducer 51 adapted to track the record 3. The tone arm is pivotally mounted, as at 52 (Fig. 8), to a swivel offset support 53 which in turn is secured to the upper end of a vertical sleeve 54 journaled in the standard 25. Extending through the sleeve 54 is a tone arm lift pin 55 having its upper end adapted to engage the tone arm and its lower end arranged to be engaged by a tone arm elevating and lowering mechanism which will hereinafter be described.

For operating the record-ejecting mechanism 20 (Fig. 5) and the tone arm 50, there is provided a unitary change-cycle control mechanism 59 comprising a plate member 60, slidably mounted on the horizontal bracket 14. A stud 61 connected between the base plate and the horizontal bracket 14 slidably maintains the plate member 60 on the bracket 14. At one end of the plate member 60 there is formed within the body portion thereof an arcuate-shaped internal cam gear 62 having gear portions A, B, C and D which are adapted to be driven by a continuously rotating pinion 63 secured to the lower end of the turntable sleeve 4 (Figs. 2 and 5). The internal cam gear 62 has a breached portion 64 normally disposed about the pinion 63, the purpose of which is to break the driving connection between the pinion 63 and the cam gear 62 at the completion of one change-cycle operation. When the cam gear 62 is driven by pinion 63, a reciprocating movement of the plate member 60 is effected thereby defining one complete record change-cycle operation.

For causing the pinion gear 63 to mesh with the cam gear 62 to initiate a change-cycle operation, there is pivotally mounted as at 65 on the plate member 60, a change-cycle initiating lever 66 having a pair of arms 67 and 68. On the arm 67 there is provided an upturned ear 69 which is arranged to be engaged by the free end of a tone arm tripping lever 70. The opposite end of the tone arm tripping lever 70 is connected to a tone arm clutch mechanism 58 (Fig. 8) which, during the reproduction of a record frictionally urges the lever 70 against the initiating lever 66, but the initiating lever is thereby moved such a small distance that it is ineffective to start a change-cycle operation. When the tone arm enters the tripping groove of a record, the tripping lever 70 is abruptly moved an abnormal distance whereupon the initiating lever 66 is pivoted in a counterclockwise direction sufficiently to cause the arm 68 to move into the path of movement of a rotating projection 71 secured to the lower end of the sleeve 4. When the projection 71 engages the arm 68, the lever 66 is pivoted against a stop 69' and the plate member 60 in turn is pivoted slightly in a counterclockwise direction to cause the pinion 63 to engage and mesh with the cam gear 62 to start the change-cycle operation.

The tone arm clutch mechanism 58 (Fig. 8) consists of a pair of spaced collars 72 and 73 secured to the lower end of the tone arm sleeve 54 and between the collars there is arranged a pair of fiber washers 74 and 75. Disposed between the fiber washers 74 and 75 is the opposite end of the tripping lever 70.

When the tone arm is tracking a record, the clutch mechanism frictionally urges the lever 70 into engagement with the change-cycle initiating lever 66. The arm 68 of lever 66 in turn is pivoted slightly into the path of movement of the rotating projection 71. As the projection 71 strikes the arm 68, the lever 66 is pivoted in a clockwise direction to move the lever 70 back against the biasing action of the clutch mechanism 58. However, when the tone arm enters the tripping groove of a record, the lever 66 is abruptly pivoted into positive engagement with the projection 71 to start the change-cycle operation in the manner already described.

When the cam gear 62 engages the pinion 63, the A portion (Fig. 5) of the cam gear 62 is first driven whereby the plate member 60 is pivoted about the stud 61 in a counterclockwise direction to the dotted line W position. As the plate member 60 is pivoted to this position, means are provided to raise the tone arm from the reproduced record. This means consists of a cam member 76 (Figs. 3, 5 and 6) formed on the plate member 60 adjacent the tone arm lift pin 55. The cam member 76 has a pair of inclined cam surfaces 77 and 78, a high cam surface 79 and a low cam surface 57. Normally, the lower end of the pin 55 is disposed on the low cam surface 57. As the plate member 60 is pivoted to the dotted line W position, the cam surface 77 engages the tone arm lift pin 55 to lift it to cause the upper end thereof to engage the tone arm and raise it from the reproduced record. The high cam surface 79 holds the tone arm lift pin 55 in an elevated position to permit the tone arm to be swung beyond the edge of the turntable.

There is mounted on the plate member 60 a lever 80 (Figs. 5 and 7) for engaging and swinging the tone arm beyond the edge of the turntable after the tone arm has been raised, and while the A portion of the cam gear 62 is being driven by the pinion 63. The lever 80 is eccentrically pivoted, as at 81, to the plate member 60 and has a pawl or arm 82 which is adapted to engage a down-turned ear 83 on the tone arm swinging lever 84 secured to the lower end of the tone arm sleeve 54. As the ear 83 is engaged by the arm 82, the tone arm is swung in a counterclockwise direction to swing the tone arm away from the turntable.

Means are provided on the plate member 60 to operate the record-ejecting mechanism 20 to lower a record onto the turntable after the tone arm has been raised and swung beyond the edge of the turntable. This means consists of a cam surface 90 (Fig. 5) formed on the edge portion of the plate member 60. As the pinion 63 meshes with the B portion of the cam gear 62, the plate member 60 is moved somewhat laterally to the left, to the dotted line X position to cause the cam surface 90 thereof to engage the arm 36 of the tripping lever 34 to pivot it in a clockwise direction to operate the mechanism in a manner already described.

Continued rotation of the pinion 63 causes the C portion of the cam gear 62 to be engaged whereupon the plate member 60 is pivoted in a clockwise direction to the dotted line Y position. Means are provided for operation during this cycle to return the tone arm over the starting groove of either a large or a small record. This means comprises a slide bar 91 affixed to the plate member 60 by a pair of pins 92 and 93. The slide bar 91 is biased against the pins 92 and 93 by a spring 89 connected between the bar 91 and the plate member 60. At one end of the slide bar 91, there is arranged an upturned ear 94 adapted, when the plate member 60 is pivoted in a clockwise direction (to the dotted line Y position), to engage the end 85 of the tone arm swinging lever 84 and pivot it in a clockwise direction to return the tone arm over the starting groove of a small record.

For returning the tone arm over a large record, there is arranged on the slide bar 91 (Fig. 5), a cam surface 95 adapted to engage the lower end of a control or tripping rod 96 (Figs. 2, 3 and 5) journaled in the standard 25 and operatively connected to the record-ejecting mechanism 20. When the record shelf 21 is rotated to hold small records, the control rod 96 is elevated above the path of movement of the slide bar 91 by means of a spring 97 operatively connected thereto. However, when the shelf 21 is rotated to hold large records, a cam surface 98 formed on the lower end of the sleeve 24 engages and cams the control rod 96 downwardly to cause its lower end to be positioned in the path of movement of the cam surface 95. When the plate member 60 is laterally moved from the dotted line W position to the dotted line X position the cam 95 engages the rod 96, whereupon the slide bar 91 is pivoted slightly in a clockwise direction by means of the arrangement of guide slots 99 and 100 disposed about the pins 92 and 93, respectively. Thus, when the plate member 60 is pivoted to the dotted line Y position, instead of the ear 94 engaging the end 85 of lever 84, an adjustable stop 101 arranged on the plate member 60 engages it to pivot the tone arm over the starting groove of a large record.

When the pinion 63 engages the D portion of the cam gear 62, the plate member 60 is moved laterally from the dotted line Y position to the full line position whereupon the lift pin 55 rides down the cam surface 78 on cam 76, to cause the pin 55 to be moved downwardly to lower the tone arm over the starting groove of a record. When the breached portion 64 reaches the pinion 63, the change-cycle operation stops.

Guide means are provided for maintaining the pinion 63 and the cam gear 62 in mesh. Secured to the bracket 14 there is provided an irregular cam surface 102 (Fig. 5) about which is arranged for movement, a downturned cam follower 103 depending from the plate member 60. When the pinion 63 is driving the cam gear 62, the pinion has a tendency to urge the plate member 60 in an outwardly direction, however, the outward movement is stopped by the cam follower 103 engaging and following the cam 102 to hold the pinion 63 and cam gear 62 in mesh.

Figure 4:
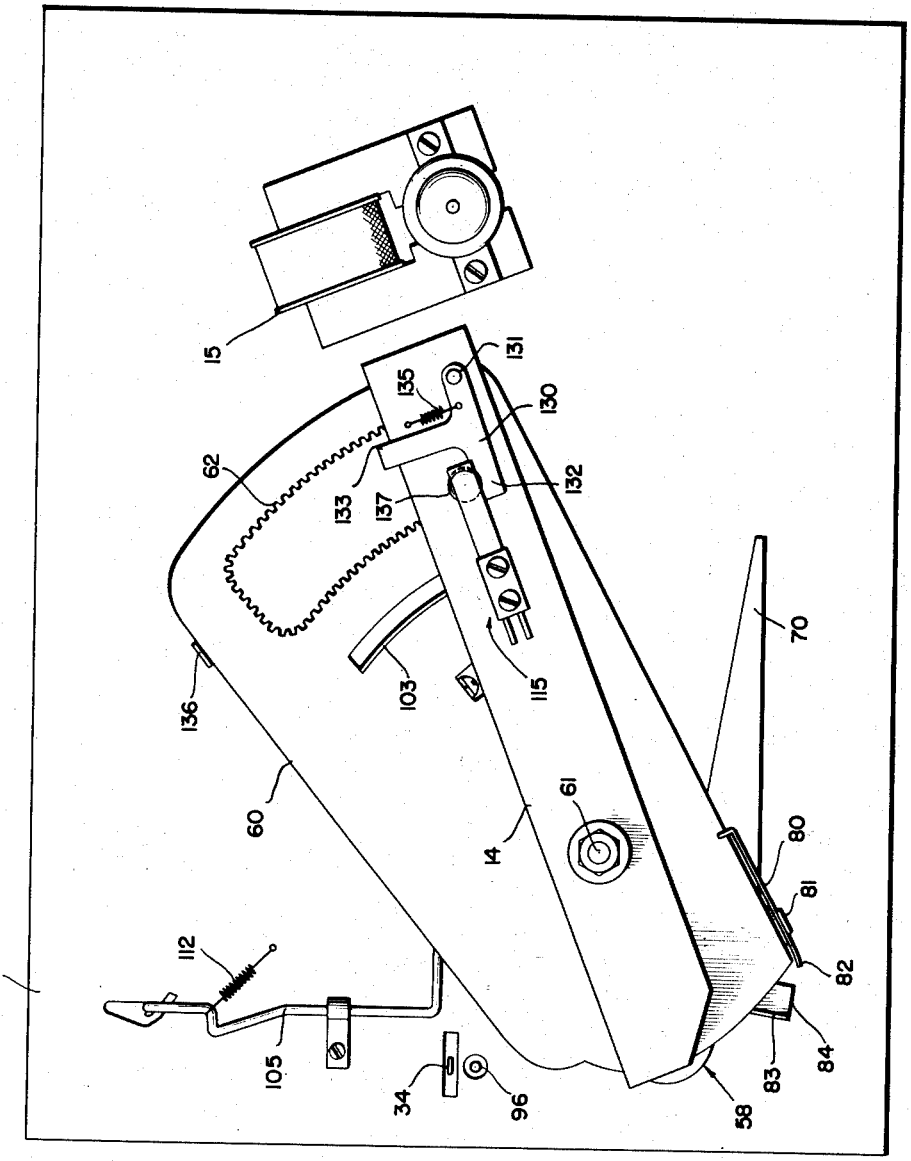
Fig. 4 is a bottom plan view of the mechanism.

Manual reject means are provided to start the change-cycle operation prior to the completion of playing a record. Slidably mounted beneath the base plate (Figs. 4 and 5), there is arranged a control rod 105 having at one end thereof a down-turned end portion 106 disposed in an elongated aperture 107 formed in the tone arm tripping lever 70. The aperture 107 is so designed to permit free movement of the lever 70 about the down-turned ear 106. The opposite end of the rod 105 has an upturned end portion to which is affixed a control knob 110. The control knob 110 is adapted to be moved over a scale 111 marked "Reject" and "Automatic." A spring 112 connected between the base plate 1 and the rod 105 normally urges the control knob 110 to the "Automatic" position. In operation, when the knob 105 is manually moved to the "Reject" position, end portion 106 is caused to engage the wall of the aperture 107 and pivot the tripping lever 70 in a clockwise direction into engagement with ear 69 of the lever 66, whereupon the lever 66 engages the projection 71 to start the change-cycle operation in the manner already described.

After the last record in the stack has been played (Figs. 2, 3, 4 and 9), there is associated with the spindle 7 an electrical switch mechanism 115 for automatically stopping the operation of the phonograph mechanism. The switch mechanism 115 is suitably affixed to the bracket 14 and has a pair of spring contacts 117 and 118 which in turn are connected to a source of power 119 in series with the motor 15. The spring contact 117 has an upturned offset contact element 120 which, when the spring contact 117 is moved in a downwardly direction, engages the contact 118 to close a circuit to the motor 15. The outer end of the spring contact 117 is arranged to normally engage a button member 137 and urge the spindle 7 in an upwardly direction. When the records are placed on the spindle, it is moved downwardly, thereby moving contact 117 to cause contact 120 thereof to engage contact 118 to close the circuit to the motor 15. When no records are on the spindle, the spring contact 117 lifts the spindle to cause the contacts 120 and 118 to be opened to stop the operation of the motor.

Associated with the switch mechanism 115 there is provided a locking bar 130 for holding the spindle 7 against vertical movement during each change-cycle operation, and releasing the spindle 7 after the last record has been played to cause the contacts 120 and 118 to be opened to stop the operation of the motor. The locking bar 130 is pivotally mounted, as at 131, to the bracket 14 and has a pair of arms 132 and 133. The arm 132 is biased against the lower end of the spindle by a spring 135.

Formed on the plate member 60 there is provided a down-turned ear 136 adapted to engage the arm 133 during each change-cycle operation to pivot the arm 132 away from the spindle. When the last record has been released from the spindle 7 the button 137 secured to the lower end of the spindle engages the arm 132 to hold the spindle 7 against vertical movement caused by the biasing action of the spring contact 117. However, after the last record has been played, and upon subsequent change-cycle operation, the ear 136 engages the arm 133 to pivot the arm 132 away from locking engagement with the spindle 7 to release it to cause the contacts 120 and 118 to be opened to stop the operation of the phonograph mechanism.

The operation of the phonograph mechanism will now be described. The following description is directed to the change-cycle operation of a small record (ten-inch size) as illustrated in the drawings. When the records are placed on the spindle, the weight of the records moves the spindle downwardly into engagement with the switch 115 whereupon contacts 118 and 120 are caused to be closed to start the operation of the motor 15 to drive the turntable. During the reproduction of the record 3, the tone arm moves gradually inwardly, moving therewith the lever 70 in a clockwise direction (Fig. 5). After the tone arm has completely tracked the record 3, it enters a tripping groove thereof, whereupon it is abruptly moved an obnormal distance to cause the lever 70 to pivot the lever 66 in a counterclockwise direction (Fig. 5). When the lever 66 is pivoted, the arm 68 thereof is moved into the path of movement of the rotating projection 71. When the projection 71 engages the arm 68, the plate member 60 is moved to cause the A portion of the cam gear 62 to engage and mesh with the rotating pinion 63 whereupon the plate member 60 pivots in a counterclockwise direction to the dotted line W position to start the change-cycle operation.

As the plate member 60 is pivoted, the inclined cam surface 77 thereof engages the tone arm lift pin 55 (Figs. 3 and 6) to raise the tone arm from the reproduced record. Simultaneously, with the raising of the tone arm, the arm 82 on the lever 80 engages the down-turned ear 83 on the tone arm swinging lever 84 to pivot it in a counterclockwise direction to swing the tone arm away from the turntable.

Continued rotation of the pinion 63 causes it to engage the B portion of the cam gear 62 (Fig. 5) whereupon plate member 60 is moved laterally to the left to the dotted line X position. As the plate member 60 is moved laterally, the cam surface 90 thereof, engages the lower end of the arm 36 of the lever 34 to pivot it in a clockwise direction (Figs. 2 and 5). As the lever 34 is pivoted, the upper end thereof engages and moves the record-ejecting plate 31 to the right to engage and eject the lowermost record from the end portion 22 on the shelf 21 and from the shoulder 8 on the spindle 7.

After the record has been lowered to the turntable, the pinion at 63 at this time engages the C portion of the cam gear 62 whereupon the plate member 60 is pivoted in a clockwise direction to the dotted line Y position. As the plate member 60 is pivoted, the upturned ear 94 on the slide bar 91 engages the arm 85 of the tone arm swinging lever 84 and pivots it in a clockwise direction to return the tone arm over the starting groove of a small record.

Similarly, when the shelf 21 is rotated to hold large records (twelve-inch size) and when the plate member 60 is moved laterally to the dotted line X position and a large record is ejected from the end portion 23 of the shelf 21, cam surface 95 on the slide bar 91 engages the lower end of rod 96 whereupon the bar 91 is pivoted slightly in a clock-wise direction by means of the arrangement of guide slots 99 and 100. It is to be observed that, when the shelf 21 is rotated to hold large records, the cam surface 98 thereof engages the rod 96 to cam it downwardly to cause it to be positioned in the path of movement of the cam surface 95. When the slide bar 91 is pivoted by its engagement with rod 96 the ear 94 thereof is caused to be displaced from normal engagement with the lever 84. Thus, when the plate member 60 is pivoted to the dotted line Y position, instead of the ear 94 engaging the lever 84, the adjustable stop 101, arranged on the plate member 60, engages the lever 84 to pivot the tone arm over the starting groove of a large record.

After the tone arm has been placed over the starting groove of the record, the pinion 63 at this time engages the D portion of the cam gear 62, whereupon the plate member 60 is moved laterally to the right to the full line position. As the plate member is moved laterally, the cam surface 78 thereof at this time causes the tone arm pin 55 to lower the tone arm to the starting groove of the lowered record. When the breached portion 64 of the cam gear reaches the pinion 63 at the end of the D portion of the cam gear, the change-cycle operation stops and the reproduction of the lowered record starts.

When the last record in the stack has been played, and upon the subsequent change-cycle operation, the down-turned ear 136 of the plate member 60 engages the arm 133 of the lever 130 to pivot it in a counterclockwise direction (Fig. 4) away from the spindle (Fig. 2). After the lever 130 is pivoted, the spindle 7 is urged in an upwardly direction by the spring contact 117 of the switch 115, whereupon the contact 120 thereof is disengaged from contact 118 to open the circuit to the motor 15 to stop the operation of the phonograph mechanism.

It is apparent that the invention may be embodied in other specific forms without departing from the spirit or essential attributes thereof, and it is desired, therefore, that the embodiments disclosed herein be considered in all respects as illustrative, reference being had to the appended claims for a determination of the scope of the invention.

What is claimed is:

1. In an automatic phonograph, a base plate, a tone arm and auxiliary moving mechanism therefor, a turntable including an integral pinion and a projection, record-supporting means operatively associated with said turntable for supporting records of small or large diameter, a record-moving mechanism operatively associated with said record-supporting means and adapted for successively moving records onto the turntable, a bracket affixed beneath said base plate, a unitary change-cycle control member slidably mounted on said bracket, said change-cycle control member comprising a lever having formed in the body portion thereof a gear rack including a breached portion disposed adjacent said pinion and said projection, a pair of cams formed on said change-cycle control member, one of said cams being operatively associated with said tone arm for raising and lowering it and the other of said cams being operatively connected to said record-moving mechanism, a change-cycle initiating lever pivotally mounted on said change-cycle control member adjacent said projection, an actuating lever operable when said tone arm enters the tripping groove of a record to move said initiating lever to engage said projection to cause said gear rack to mesh with said pinion for reciprocating said change-cycle control member through a record change-cycle, an actuating member on said change-cycle control member adapted to engage said tone arm moving mechanism to swing said tone arm beyond the edge of the turntable, a tone arm control member affixed to said tone arm, an adjustable control member mounted on said change-cycle control member adapted for engaging said tone arm control member and returning the tone arm over the starting groove of a small record, a fixed stop, a tripping cam operable when said record-supporting means is moved to hold large records for moving said adjustable control member to allow said tone arm control member to be engaged by said first stop to return said tone arm over the starting groove of a large record, and means formed on said change-cycle control member for operating said record-ejecting mechanism.

2. In an automatic phonograph, a base plate, a tone arm, a rotatable turntable including a vertical sleeve rotatably mounted on said base plate, said sleeve having an integral pinion and a projection, a vertical spindle slidably mounted in said sleeve for supporting a stack of records at their centers, a rotatable auxiliary record-supporting means mounted on said base plate and associated with said vertical spindle for supporting records of small or large diameter at their peripheral edges, a record-ejecting mechanism operatively connected to said auxiliary record-supporting means for engaging the peripheral edge of the lowermost record in said stack and moving it simultaneously from said spindle and from said auxiliary record-supporting means, a horizontal supporting bracket affixed beneath said base plate, a unitary reciprocable change-cycle control member slidably mounted on said bracket for carrying out a record change-cycle operation, said control member comprising a plate member having formed in the body portion thereof a gear rack including a breached portion normally disposed adjacent said pinion and said projection, cam means formed on said control member, said cam means being associated with said tone arm for raising and lowering it during a record change-cycle operation, a change-cycle initiating lever pivotally mounted on said plate member adjacent said projection, a frictionally mounted tripping lever operatively connected to said tone arm for urging said initiating lever into engagement with said projection when said tone arm enters the tripping groove of a record to move said control member a predetermined distance to cause said gear rack to mesh with said pinion for reciprocating said plate member through a record change-cycle, a bell crank lever including a pair of first and second arms operatively affixed to said tone arm, a pawl member on said control element adapted to engage said first bell crank arm to swing said tone arm beyond the edge of the turntable, a slidable stop mounted on said control member adapted to engage said second bell crank arm for returning the tone arm over the starting groove of a small record, a fixed stop, a tripping rod operable when said record auxiliary support is rotated to hold large records for engagement with said slidable member for moving it suitably to allow said second bell crank arm to be engaged by said fixed stop to return said tone arm over the starting groove of a large record, and a trip arm formed on said control member for operating said record-ejecting mechanism.

ARLINGTON V. LAPISH.

References Cited in the file of this patent

UNITED STATES PATENTS

| Number | Name | Date |
|---|---|---|
| 2,279,851 | Waln et al. | Apr. 14, 1942 |
| 2,295,092 | Offen | Sept. 8, 1942 |
| 2,331,383 | Faulkner | Oct. 12, 1943 |
| 2,394,539 | Erwood et al. | Feb. 12, 1946 |
| 2,428,258 | Alexandersson et al. | Sept. 30, 1947 |
| 2,435,264 | Ansar | Feb. 3, 1948 |
| 2,487,771 | Miller et al. | Nov. 8, 1949 |
| 2,536,477 | Vistain | Jan. 2, 1951 |
| 2,541,072 | Jones | Feb. 13, 1951 |

FOREIGN PATENTS

| Number | Country | Date |
|---|---|---|
| 554,554 | Great Britain | July 8, 1943 |